US012271133B2

(12) United States Patent
Kume et al.

(10) Patent No.: US 12,271,133 B2
(45) Date of Patent: Apr. 8, 2025

(54) FIXING APPARATUS AND IMAGE FORMING APPARATUS

(71) Applicant: CANON KABUSHIKI KAISHA, Tokyo (JP)

(72) Inventors: Takao Kume, Kanagawa (JP); Akimichi Suzuki, Kanagawa (JP); Satoshi Nishida, Kanagawa (JP); Kohei Okayasu, Shizuoka (JP); Takanori Mitani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/544,097

(22) Filed: Dec. 18, 2023

(65) Prior Publication Data

US 2024/0255875 A1 Aug. 1, 2024

(30) Foreign Application Priority Data

Jan. 31, 2023 (JP) ................................ 2023-012440

(51) Int. Cl.
*G03G 15/20* (2006.01)
*G03G 15/00* (2006.01)
(Continued)

(52) U.S. Cl.
CPC ..... *G03G 15/2053* (2013.01); *G03G 15/2017* (2013.01); *G03G 15/2064* (2013.01); *G03G 15/657* (2013.01); *G03G 21/06* (2013.01); *G03G 21/1685* (2013.01); *G03G 2215/20* (2013.01); *G03G 2215/2003* (2013.01); *G03G 2221/1639* (2013.01)

(58) Field of Classification Search
CPC ........... G03G 15/2017; G03G 15/2053; G03G 15/2064; G03G 15/657; G03G 21/06; G03G 21/1685; G03G 2215/20; G03G 2215/2003; G03G 2221/1639
See application file for complete search history.

(56) References Cited

U.S. PATENT DOCUMENTS

| | | | | |
|---|---|---|---|---|
| 6,035,174 A * | 3/2000 | Ito | G03G 15/2064 399/331 |
| 2014/0029992 A1* | 1/2014 | Yamamoto | G03G 15/2064 399/328 |
| 2015/0338806 A1* | 11/2015 | Nakayama | G03G 15/2053 399/329 |

FOREIGN PATENT DOCUMENTS

| | | |
|---|---|---|
| JP | 2003337485 A | 11/2003 |
| JP | 2009093017 A | 4/2009 |

* cited by examiner

*Primary Examiner* — Joseph S Wong
(74) *Attorney, Agent, or Firm* — Canon U.S.A., Inc. IP Division

(57) ABSTRACT

A fixing apparatus includes first and second rotating members, a heater having a heating element and a substrate, and first and second contact members. A direction of a longer side on a surface of the substrate where the heating element is disposed is a longitudinal direction. A direction intersecting the longitudinal direction is a widthwise direction. The first contact member is disposed in a region outside a region where a maximum size recording material conveyed to a nip portion passes through the nip portion on one end side in the longitudinal direction on an outer circumferential surface of the first rotating member, and the second contact member is disposed in the region outside the region where the maximum size recording material conveyed to the nip portion passes through the nip portion on an other end side in the longitudinal direction on an outer circumferential surface of the second rotating member.

9 Claims, 12 Drawing Sheets

(51) Int. Cl.

| | |
|---|---|
| ***G03G 21/06*** | (2006.01) |
| ***G03G 21/16*** | (2006.01) |

FIXING APPARATUS AND IMAGE FORMING APPARATUS

BACKGROUND

Field

The present disclosure relates to a fixing apparatus and, more particularly, to a fixing apparatus used for image forming apparatuses such as electrophotographic copying machines and laser beam printers.

Description of the Related Art

Film-heating processes have been known for a fixing apparatus used for electrophotographic image forming apparatuses. Japanese Patent Application Laid-Open No. 2003-337485 discloses a heating element that heats an object to be heated through at least a thin film, and pressure that presses the object to be heated.

Conventional film-heating type heating apparatuses include a heater having a resistance heating element on a ceramic substrate, a fixing film rotating and being heated while in contact with the heater, and a pressure roller for forming a nip portion with the heater across the fixing film. In such a conventional configuration, when the fixing film and the pressure roller are charged, an electrostatic offset or an electrical disturbance of a developer on a recording material may possibly occur. Here, a fixing film and a pressure roller may be grounded in consideration of an electrical disturbance. However, a difference in potential between the contact and the non-contact sides may increase in the longitudinal direction depending on the arrangement of a contact for grounding the fixing film and a contact for grounding the pressure roller.

SUMMARY

The present disclosure is directed to reducing the difference in potential in the longitudinal direction.

According to an aspect of the present disclosure, a fixing apparatus includes a first rotating member, a heater that is elongate and provided with a heating element and a substrate with the heating element installed on the substrate, and disposed in a space inside the first rotating member, a second rotating member, wherein the first rotating member is pinched by the heater and the second rotating member, and an image formed on a recording material is heated at a nip portion, via the first rotating member, so that the image is fixed to the recording material, a first contact member configured to come into contact with the first rotating member to ground the first rotating member, and a second contact member configured to come into contact with the second rotating member to ground the second rotating member, wherein, in a case where a direction of a longer side on a surface of the substrate where the heating element is disposed is a longitudinal direction and a direction perpendicularly intersecting with the longitudinal direction on the surface of the substrate is a widthwise direction, the first contact member is disposed in a region outside a region where a recording material with a maximum size conveyed to the nip portion passes through the nip portion on one end side in the longitudinal direction on an outer circumferential surface of the first rotating member, and the second contact member is disposed in the region outside the region where the recording material with the maximum size conveyed to the nip portion passes through the nip portion on an other end side in the longitudinal direction on an outer circumferential surface of the second rotating member.

According to the present disclosure, the difference in potential in the longitudinal direction can be reduced.

Further features of the present disclosure will become apparent from the following description of exemplary embodiments with reference to the attached drawings.

DESCRIPTION OF THE EMBODIMENTS

Exemplary embodiments of the present disclosure will be described below with reference to the accompanying drawings. The following exemplary embodiments do not limit the present disclosure within the scope of the appended claims. Not all of the combinations of the features described in the exemplary embodiments are indispensable to the solutions for the present disclosure.

Image Forming Apparatus

Figure 1:
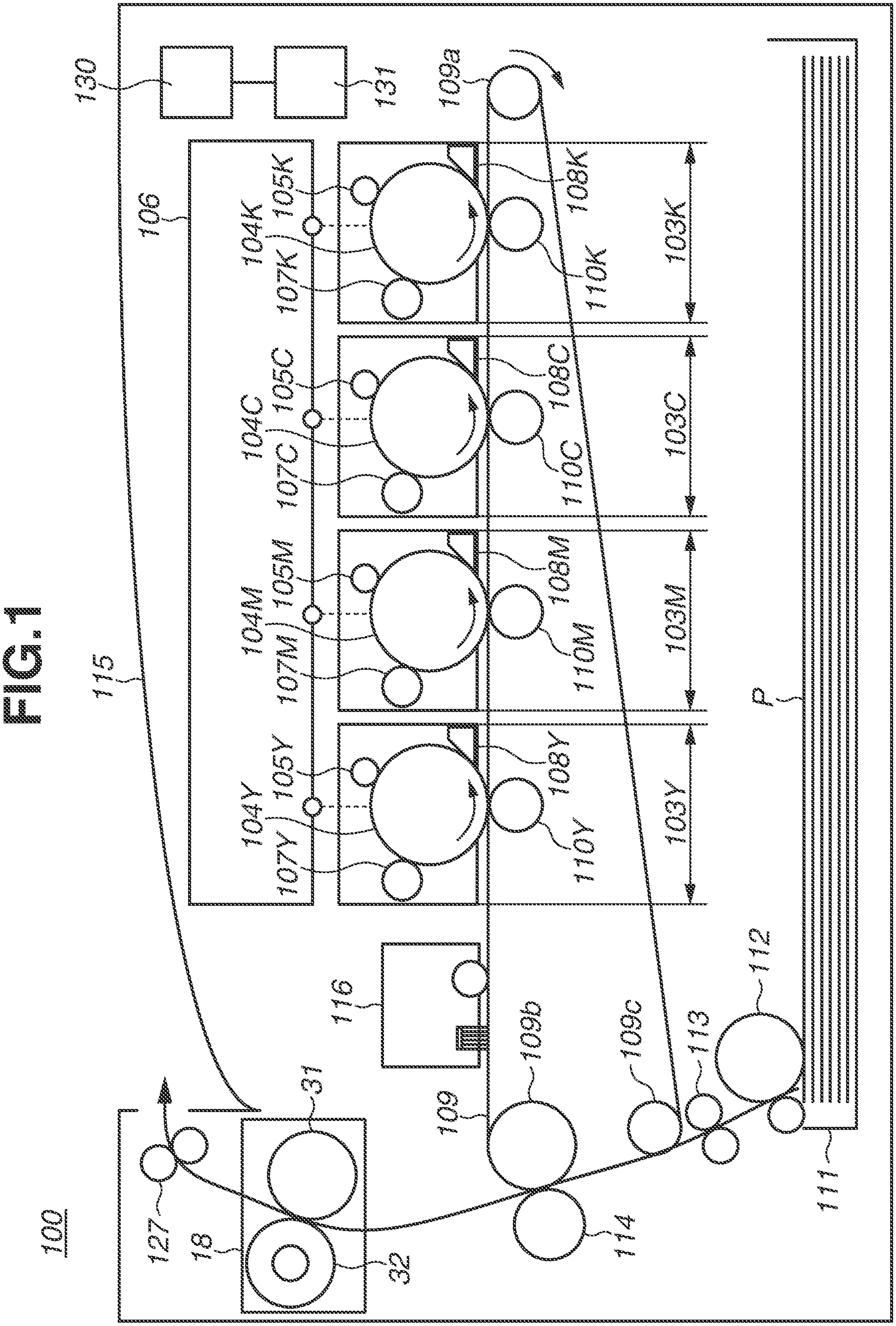
FIG. 1 schematically illustrates a configuration of an image forming apparatus.

A first exemplary embodiment will be described below. An image forming apparatus 100 according to the present exemplary embodiment will be described below. FIG. 1 schematically illustrates a configuration of the image forming apparatus 100 employing an electrophotographic recording technique according to the first exemplary embodiment. The image forming apparatus 100 includes four different image forming stations 103Y, 103M, 103C, and 103K which are approximately linearly disposed. Of the four image forming stations 103Y, 103M, 103C, and 103K, the image forming station 103Y forms a yellow image, the image forming station 103M forms a magenta image, the image forming station 103C forms a cyan image, and the image forming station 103K forms a black image (hereinafter, yellow, magenta, cyan, and black are referred to as Y, M, C, and K, respectively). The image forming stations 103Y, 103M, 103C, and 103K include photosensitive drums 104Y, 104M, 104C, and 104K as image carriers, and charge rollers 105Y, 105M, 105C, and 105K as charging units, respectively. The image forming stations 103Y, 103M, 103C, and 103K further include an exposure apparatus 106 as an exposure unit, development apparatuses 107Y, 107M, 107C, and 107K as developing units, and cleaning apparatuses 108Y, 108M, 108C, and 108K as cleaning units, respectively.

When a video controller 130 receives image information from an external apparatus (not illustrated) such as a host computer, the video controller 130 transmits, for example, a print signal to a control unit 131 as a Central Processing Unit (CPU), so that an image forming operation is started. In image forming, the photosensitive drum 104Y of the image forming station 103Y is rotated in the direction of the arrow (FIG. 1) by a rotation control unit (drive control unit, not illustrated) in response to a printing instruction. Firstly, the outer circumferential surface (front surface) of the photosensitive drum 104Y is uniformly charged by the charge roller 105Y. When the exposure apparatus 106 irradiates the charging plane on the surface of the photosensitive drum 104Y with a laser beam corresponding to image data, an electrostatic latent image is formed. The development apparatus 107Y visualizes the electrostatic latent image by Y toner to form a Y toner image. In the above-described process, a Y toner image is formed on the surface of the photosensitive drum 104Y. The image forming stations 103M, 103C, and 103K perform a similar image forming process. As a result, an M toner image is formed on the surface of the photosensitive drum 104M, a C toner image is formed on the surface of the photosensitive drum 104C, and a K toner image is formed on the surface of the photosensitive drum 104K.

An intermediate transfer belt 109 provided along the arrangement direction of the image forming stations 103Y, 103M, 103C, and 103K is stretched by a drive roller 109*a* and driven rollers 109*b* and 109*c*. The drive roller 109*a* is rotated in the direction of the arrow in FIG. 1 by the rotation control unit (drive control unit, not illustrated) in response to a printing instruction. Thus, the intermediate transfer belt 109 is moved to rotate at a predetermined process speed along the image forming stations 103Y, 103M, 103C, and 103K. Toner images of different colors are sequentially transferred onto the outer circumferential surface (front surface) of the intermediate transfer belt 109 in an overlapped way by primary transfer rollers 110Y, 110M, 110C, and 110K disposed to face the photosensitive drums 104Y, 104M, 104C, and 104K, respectively, across the intermediate transfer belt 109. In the above-described process, a four-color full color toner image is formed on the surface of the intermediate transfer belt 109.

After the primary transfer, transfer residual toners remaining on the surface of the photosensitive drums 104Y, 104M, 104C, and 104K are removed by cleaning blades (not illustrated) disposed in the cleaning apparatuses 108Y, 108M, 108C, and 108K, respectively. The photosensitive drums 104Y, 104M, 104C, and 104K prepare for the next image forming. The above-described photosensitive drums 104, charge rollers 105, development apparatuses 107, primary transfer rollers 110, and a scanner unit (not illustrated) are included in the image forming units for forming a non-fixed image on a recording material P.

Meanwhile, the recording materials P stacked on a feeding cassette 111 disposed at the bottom of the image forming apparatus 100 are separated one by one from the feeding cassette 111 by a feed roller 112 and then fed to a registration roller pair 113. The registration roller pair 113 sends out the fed recording material P to a transfer nip portion between the intermediate transfer belt 109 and a secondary transfer roller 114.

The secondary transfer roller 114 is disposed to face the driven roller 109*b* across the intermediate transfer belt 109. A bias voltage is applied to the secondary transfer roller 114 from a high-voltage power source (not illustrated) when the recording material P passes through the transfer nip portion. Thus, the full color toner image is secondarily transferred from the surface of the intermediate transfer belt 109 to the recording material P passing through the transfer nip portion.

The recording material P carrying the toner image is conveyed to a fixing apparatus 18 including a heating member 31 and a pressure roller 32 as a pressure member. Subsequently, the recording material P is heated with the heat from a heater and then pressurized in the fixing apparatus 18 as a heating apparatus. Then, the toner image is heat-fixed onto the recording material P. The recording material P is discharged from the fixing apparatus 18 to a discharge tray 115 outside the image forming apparatus 100 by a discharge roller 129. After the secondary transfer, transfer residual toner remaining on the surface of the intermediate transfer belt 109 is removed by an intermediate transfer belt cleaning apparatus 116. Then, the intermediate transfer belt 109 prepares for the next image forming.

The image forming apparatus 100 has been described above centering on a tandem type color laser printer that transfers toner of two or more different colors onto a recording material via an intermediate transfer belt, as a typical example. However, the present exemplary embodiment is applicable not only to a tandem type but also to a direct transfer method for transferring toner of two or more different colors onto a recording material. The present exemplary embodiment is also applicable to monochromatic laser printers using monochrome toner.

Fixing Apparatus

Figure 2:
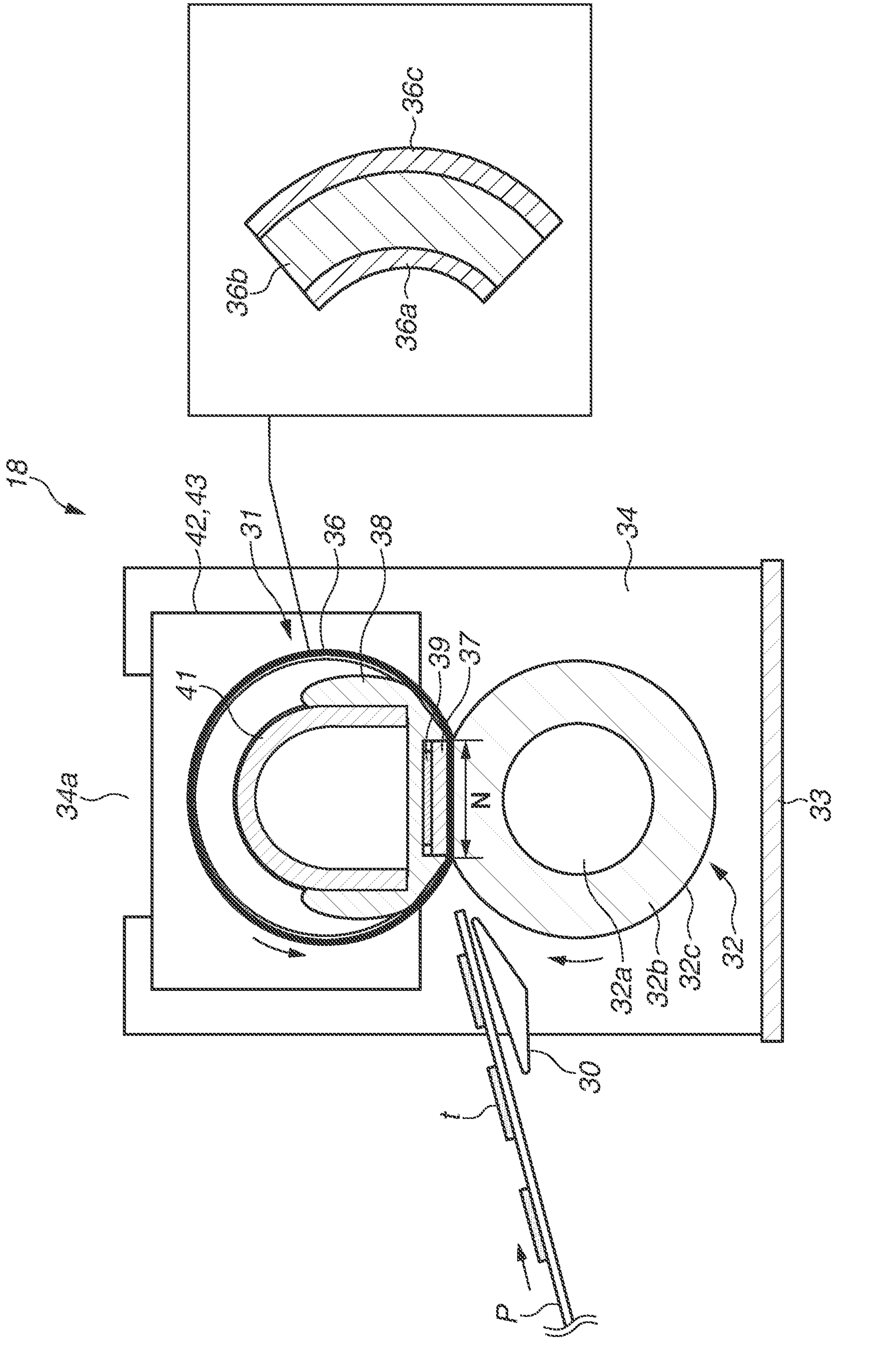
FIG. 2 is cross-sectional view illustrating a fixing apparatus viewed from a longitudinal direction.
Figure 3:
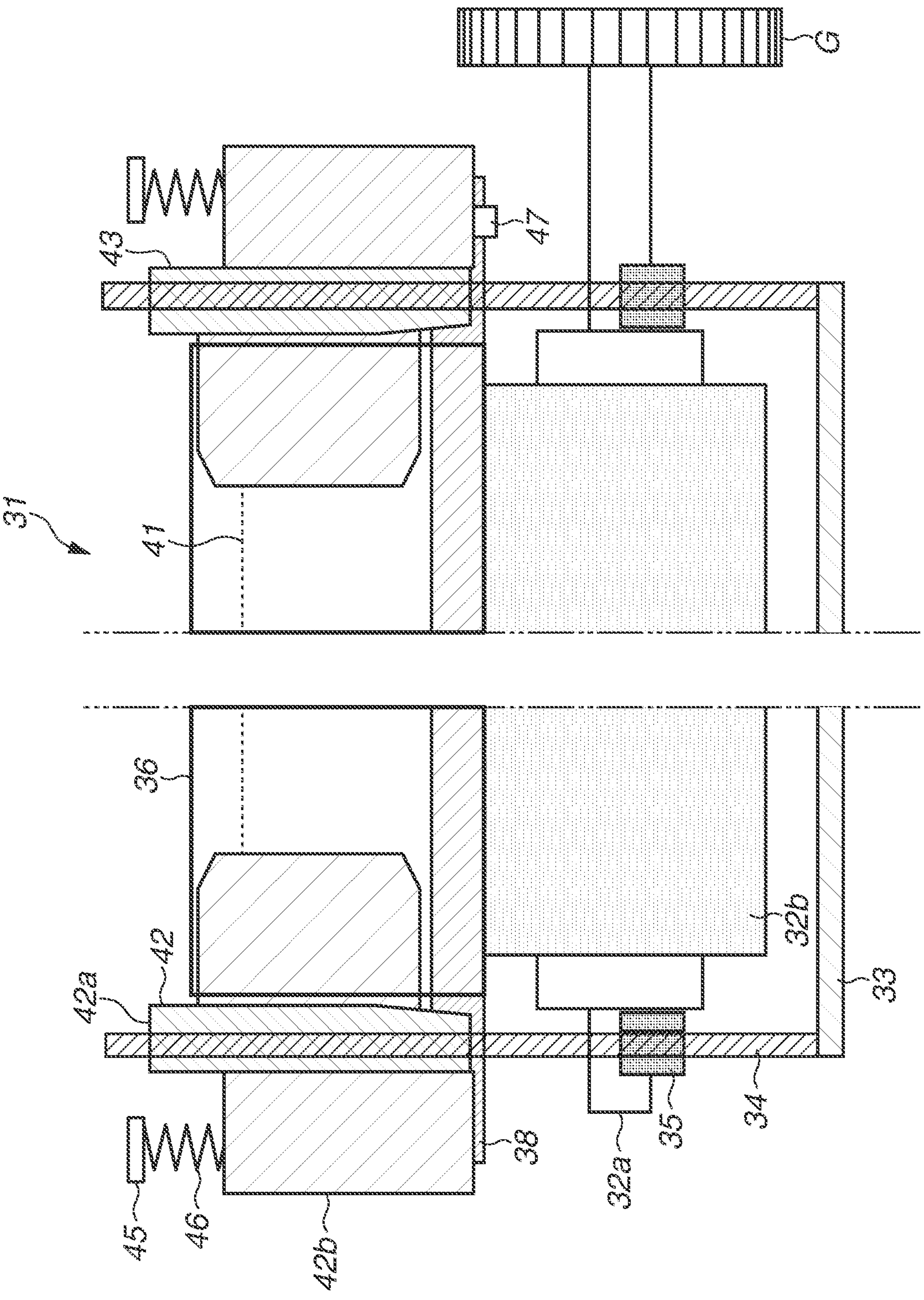
FIG. 3 is a schematic view illustrating both ends of the fixing apparatus viewed from a paper feed direction.

FIG. 2 is a cross-sectional view illustrating the fixing apparatus 18 viewed from the longitudinal direction, and FIG. 3 is a schematic view illustrating both ends of the fixing apparatus 18 viewed from the paper feed direction. The fixing apparatus 18 includes a flexible fixing film 36 as a first rotating member, a heater 37 disposed in a space inside the fixing film 36, and a pressure roller 32 as a second rotating member for forming a nip portion N with the heater 37 across the fixing film 36. Referring to FIG. 2, the direction of the longer side of the elongate heater 37 (direction from the front to the depth sides) is also referred to as a longitudinal direction, the direction of the shorter side of the heater 37 (horizontal direction) perpendicularly intersecting with the longitudinal direction is also referred to as a widthwise direction, and the direction of the thickness of the heater 37 (vertical direction) perpendicularly intersecting with the longitudinal and the widthwise directions is also referred to as a thickness direction.

The heating member 31 is a film unit including a flexible cylindrical fixing film 36. The heating member 31 and the pressure roller 32 are disposed approximately in parallel between right and left side plates 34 of an apparatus frame 33 in a state where the heater 37 faces the pressure roller 32 across the fixing film 36.

The pressure roller 32 includes a core 32*a*, an elastic layer 32*b* formed outside the core 32*a*, and a mold release layer 32*c* formed outside the elastic layer 32*b*. The elastic layer 32*b* is made of a material formed by foaming silicone rubber or fluoro rubber. The mold release layer 32*c* is made of perfluoroalkoxy alkane (PFA), polytetrafluoroethylene (PTFE), or tetrafluoroethylene-hexafluoropropylene copolymer (FEP).

According to the present exemplary embodiment, the pressure roller 32 includes the core 32*a* made of stainless steel having an outer diameter of 11 mm, and the elastic layer 32*b* as a foamed non-conductive elastic layer having a thickness of about 3.5 mm formed on the core 32*a* through injection molding. The outer surface of the non-conductive elastic layer is coated with a conductive PFA resin tube 32*c* having a thickness of about 20 μm. The pressure roller 32 has an outer diameter of 18 mm. The pressure roller 32 desirably has a hardness of 40 to 50 degrees (measured with an Asker C hardness meter) under a load of 9.8 N from the viewpoint of the formation and durability of the nip portion N. According to the present exemplary embodiment, the hardness is adjusted to 45 degrees. The elastic layer of the pressure roller 32 has a longitudinal length of 226 mm. The longitudinal surface resistance value of the surface layer of the pressure roller 32 is set to 5.0 MΩ or less when 250 V is applied by using the Digital Megohm HiTester from HIOKI E.E. CORPORATION with at least a measurement width of 220 mm corresponding to the width of letter (LTR) size paper in the direction perpendicularly intersecting with the conveyance direction.

As illustrated in FIG. 3, the pressure roller 32 is rotatably supported between the side plates 34 of the apparatus frame 33 via bearing members 35 at both longitudinal ends of the core 32*a*. A drive gear G is fixed to one end of the core 32*a* of the pressure roller 32. The pressure roller 32 is driven to rotate by a rotational force transmitted from a driving source (not illustrated) to a drive gear G.

The heating member 31 illustrated in FIG. 2 includes a fixing film 36, a heater 37 disposed in the space inside the fixing film 36, a heater holder 38 for supporting the heater 37, and a soaking plate 39 for uniforming the heat of the heater 37. The heating member 31 further includes a metal pressurizing stay 41 for reinforcing the heater holder 38, and flanges 42 and 43 for regulating the longitudinal movement of the fixing film 36.

The fixing film 36 is a cylindrical flexible member including a base layer 36*a*, an elastic layer 36*b* formed outside the base layer 36*a*, and a mold release layer 36*c* as the surface layer formed outside the elastic layer 36*b*. The longitudinal surface resistance value of the base layer 36*a* is set to 154.0 MΩ or less when 250 V is applied by using the Digital Megohm HiTester from HIOKI E.E. CORPORATION at least with a measurement width of 220 mm corresponding to the width of LTR size paper in the direction perpendicularly intersecting with the conveyance direction.

According to the present exemplary embodiment, the fixing film 36 has an inner diameter of 18 mm, and the base layer 36*a* is made of a polyimide base material having a thickness of 60 μm. The elastic layer 36*b* is made of conductive silicone rubber having a thickness of about 150 μm. The mold release layer 36*c* is made of a conductive PFA resin tube having a thickness of 15 μm. As illustrated in FIG. 2, the heater holder 38 is made of a rigid, heat-resistant, and heat-insulating material having a cross-sectional shape of an approximate semicircular gutter. According to the present exemplary embodiment, the heater holder 38 is made of a liquid crystal polymer. The heater holder 38 can support the inner surface of the fixing film 36 externally fit to the heater holder 38 and hold the heater 37.

Figure 4:
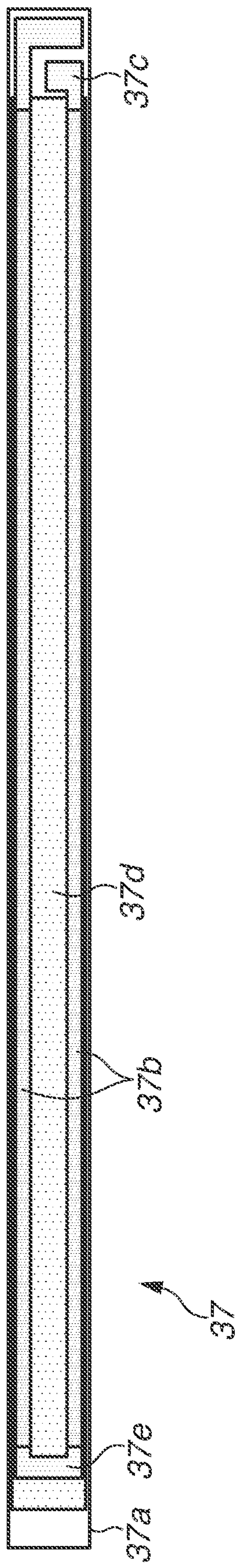
FIG. 4 schematically illustrates a configuration of a heater.

FIG. 4 schematically illustrates a configuration of the heater 37. The heater 37 includes a ceramic substrate 37*a* made of alumina or aluminum nitride, and heating elements 37*b* made of a silver-palladium alloy formed on the substrate 37*a* through screen printing. The heating elements 37*b* are connected with an electric contact 37*c* made of silver. According to the present exemplary embodiment, two heating elements 37*b* are connected in series to provide a resistance value of 18Ω. A glass coat 37*d* as a protection layer is formed on the heating elements 37*b* to protect the heating elements 37*b* and improve the slidability with the fixing film 36.

The heater 37 is supported by the seat surface of the heater holder 38 and disposed along the fixing film 36. The substrate 37*a* of the heater 37 is made of alumina and has a shape of a rectangular parallelepiped with a longitudinal length of 270 mm, a widthwise length of 5.8 mm, and a thickness of 1.0 mm in the thickness direction. The heating elements 37*b* are connected in series by a conductor 37*e* at a longitudinal end. Each of the heating elements 37*b* has a longitudinal length of 222 mm and a widthwise length of 0.9 mm. The widthwise positions of the heating elements 37*b* are 0.7 mm from the widthwise ends of the ceramic substrate 37*a* on both the upstream and the downstream sides, i.e., the heating elements 37*b* are formed at positions symmetric with respect to the widthwise center. A heat-resistant grease is applied to the inner surface of the fixing film 36 to improve the slidability of the heater 37 and the heater holder 38 with the inner surface of the fixing film 36.

The pressurizing stay 41 is U-shaped and extends in the longitudinal direction. The pressurizing stay 41 supports the heater holder 38 to improve the bending rigidity of the heating member 31. The pressurizing stay 41 according to the present exemplary embodiment is made of stainless steel having a thickness of 1.6 mm and formed through bending processing.

The flanges 42 and 43 support both longitudinal ends of the pressurizing stay 41. The flanges 42 and 43 are engaged with vertical grooves of the right and left side plates 34 of the apparatus frame 33. According to the present exemplary embodiment, the flanges 42 and 43 are made of a liquid crystal polymer resin.

As illustrated in FIG. 3, a pressurizing spring 46 is disposed between a pressure member 42*b* and a pressure arm 45 of each of the right and left flanges 42 and 43. When the right and left flanges 42 and 43 are pressed by the pressurizing springs 46, the heater 37 is pressed against the pressure roller 32 across the fixing film 36 via the pressurizing stay 41 and the heater holder 38. According to the present exemplary embodiment, the total contact pressure of the fixing film 36 and the pressure roller 32 is 180 N. Thus, the heater 37 forms the nip portion N having a width of about 6 mm together with the pressure roller 32 against the elasticity of the pressure roller 32 across the fixing film 36.

When the rotational force is transmitted from the driving source (not illustrated) to the drive gear G of the pressure roller 32, the pressure roller 32 is driven to rotate in the clockwise direction in FIG. 2 at a predetermined speed. According to the present exemplary embodiment, the rotational speed of the pressure roller 32 is controlled so that the recording material P is conveyed at a conveyance speed of 100 mm/sec. When the pressure roller 32 is driven to rotate, the fixing film 36 rotates in the counterclockwise direction in FIG. 2 by the frictional force acting between the pressure roller 32 and the fixing film 36 at the nip portion N. Accordingly, the fixing film 36 slides in contact with the heater 37 at the nip portion N, and is driven to rotate in the counterclockwise direction around the heater holder 38 by the rotation of the pressure roller 32.

The fixing film 36 rotates, and power is supplied to the heater 37. When the temperature detected by a thermistor (not illustrated) of the heater 37 reaches a target temperature, the recording material P is conveyed to the nip portion N. A fixing apparatus entry guide 30 guides the recording material P with a non-fixed toner image t carried thereon, toward the nip portion N.

When the recording material P with the non-fixed toner image t carried thereon is conveyed to the nip portion N, the surface of the recording material P carrying the toner image t comes into contact with the fixing film 36 at the nip portion N, and the recording material P is nipped and conveyed at the nip portion N with the rotation of the fixing film 36. In this conveyance process, the non-fixed toner image t on the recording material P is heated and pressurized by the fixing film 36 and the pressure roller 32, respectively, to be fixed to the recording material P. When the recording material P passes through the nip portion N, the recording material P is curvature-separated from the surface of the fixing film 36. Then, the recording material P is discharged out of the fixing apparatus 18 by a discharge roller pair (not illustrated). The maximum paper feedable width of the fixing apparatus 18 according to the present exemplary embodiment is 216 mm, and printing on the recording material P of the LTR size can be performed at a printing speed of 20 prints per minute (PPM).

Figure 5A:
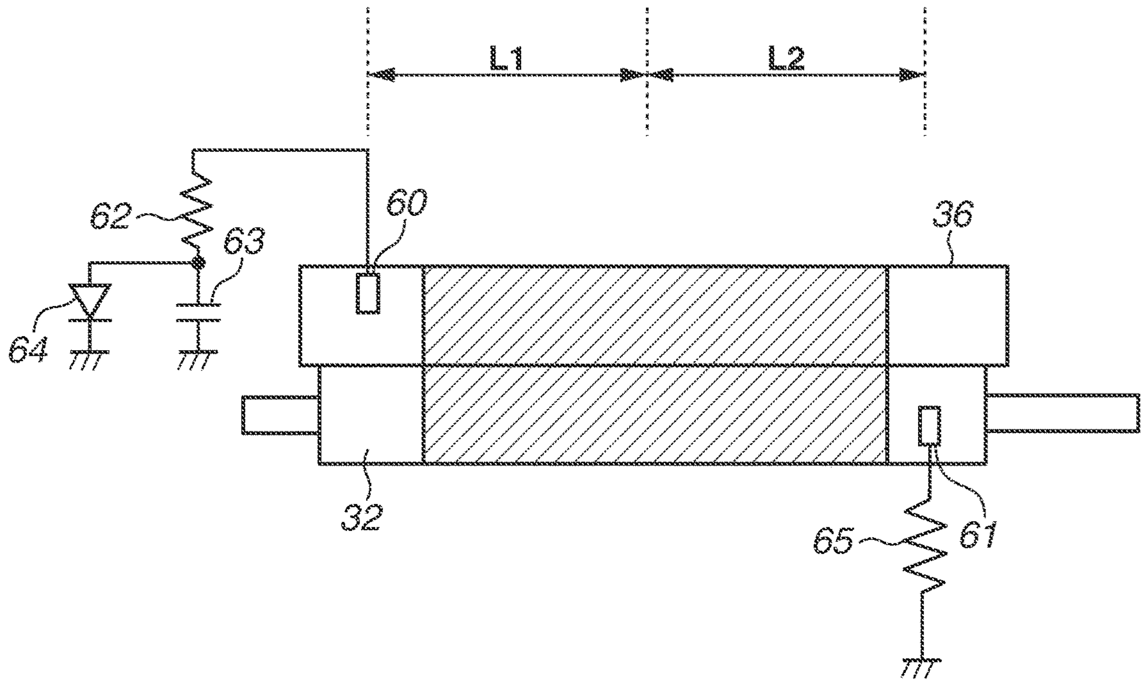
FIGS. 5A and 5B illustrate contact members according to a present exemplary embodiment.
Figure 5B:
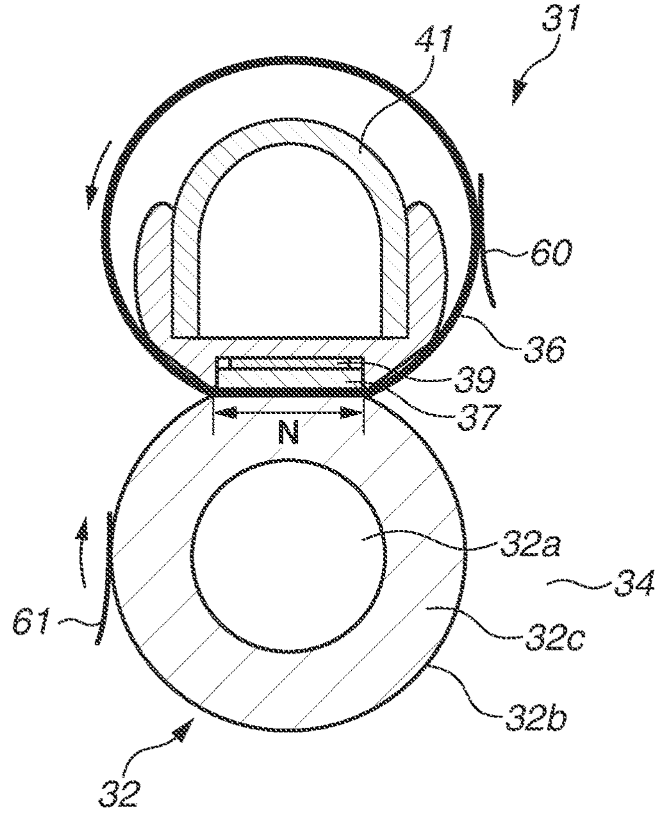

Contact members 60 and 61 according to the present exemplary embodiment will be described below with reference to FIGS. 5A and 5B. FIG. 5A illustrates arrangements of the contact members 60 and 61 on the fixing film 36 and the pressure roller 32, respectively, in the longitudinal direction. FIG. 5B illustrates contact states of the contact members 60 and 61 on the surfaces of the fixing film 36 and the pressure roller 32, respectively.

Referring to FIG. 5A, the shaded portion indicates the longitudinal region of the nip portion N where the recording material P having the maximum size conveyed at a center reference is fed (hereinafter this region is also referred to as a paper feed region). According to the present exemplary embodiment, the region closer to one end side in the longitudinal direction than the paper feed region is referred to as a region R1, and the region closer to the other end side in the longitudinal direction is referred to as a region R2. The contact member 60 for grounding the fixing film 36 is disposed in the region R1 in the longitudinal direction. The contact member 61 for grounding the pressure roller 32 is disposed in the region R2 in the longitudinal direction. According to present exemplary embodiment, the contact member 60 is disposed at the position by a distance L1 from a conveyance reference, and the contact member 61 is disposed at the position by a distance L2 from the conveyance reference. Although the contact members 60 and 61 are disposed so that the distances L1 and L2 are equal as an example, the present exemplary embodiment is not limited to this example. A contact member needs to be disposed in each of the region R1 on one end side in the longitudinal direction and the region R2 on the other end side in the longitudinal direction.

Although the recording material P is conveyed at the center reference as an example, the present exemplary embodiment is not limited to this example. For example, the recording material P is conveyed with reference to one side, the longitudinal center of the fixing film 36 may be used as a reference. In this case, the contact member 60 is disposed at the position by the distance L1 from the center of the fixing film 36, and the contact member 61 is disposed at the position by the distance L2 from the center of the fixing film 36. Although the contact members 60 and 61 are disposed so that the distances L1 and L2 are equal as an example, the present exemplary embodiment is not limited to this example. A contact member needs to be disposed in each of the region R1 on one end side in the longitudinal direction and the region R2 on the other end side in the longitudinal direction.

The contact member 60 is made of a heat-resistant resin provided with conductivity. According to the present exemplary embodiment, the contact member 60 is a polyimide film containing distributed carbon and having a thickness of 60 μm and a shape of 22 mm by 6.55 mm. Contact states of the contact member 60 and the fixing film 36 are illustrated in FIG. 5B.

The polyimide film as the contact member 60 is disposed on the outer surface (outer circumferential surface) of the fixing film 36 so that the longer side of the contact member 60 is parallel to the rotational direction of the fixing film 36, and the contact member 60 comes into contact with the fixing film 36 with a contact pressure of 0.0148 to 0.0235 N in the forward direction. As a grounding condition, the contact member 60 is connected with a parallel circuit of a capacitor 63 and a diode 64 via a 1.5-MΩ resistor 62 and grounded to a grounding portion. This configuration is intended to prevent an electrostatic offset or banding that occurs when the alternating current (AC) voltage oscillation driving the heater 37 of the fixing apparatus 18 is superimposed on the direct current (DC) voltage at the transfer nip portion across the recording material P.

The contact member 61 is made of metal. According to the present exemplary embodiment, the contact member 61 is stainless steel (SUS) having a thickness of 0.12 mm and a shape of 25 mm by 7.00 mm. Contact states of the contact member 61 and the pressure roller 32 are illustrated in FIG. 5B. The SUS as the contact member 61 is disposed on the outer surface (outer circumferential surface) of the pressure roller 32 so that the longer side of the contact member 61 is parallel to the rotational direction of the pressure roller 32, and the contact member 61 comes into contact with the pressure roller 32 with a contact pressure of 0.245 to 0.343 N in the forward direction. As a grounding condition, the contact member 61 is grounded to the grounding portion via a 1-GΩ resistor 65. This configuration is intended to prevent an offset due to charging, separating discharge, and a transfer current leakage.

Figure 6:
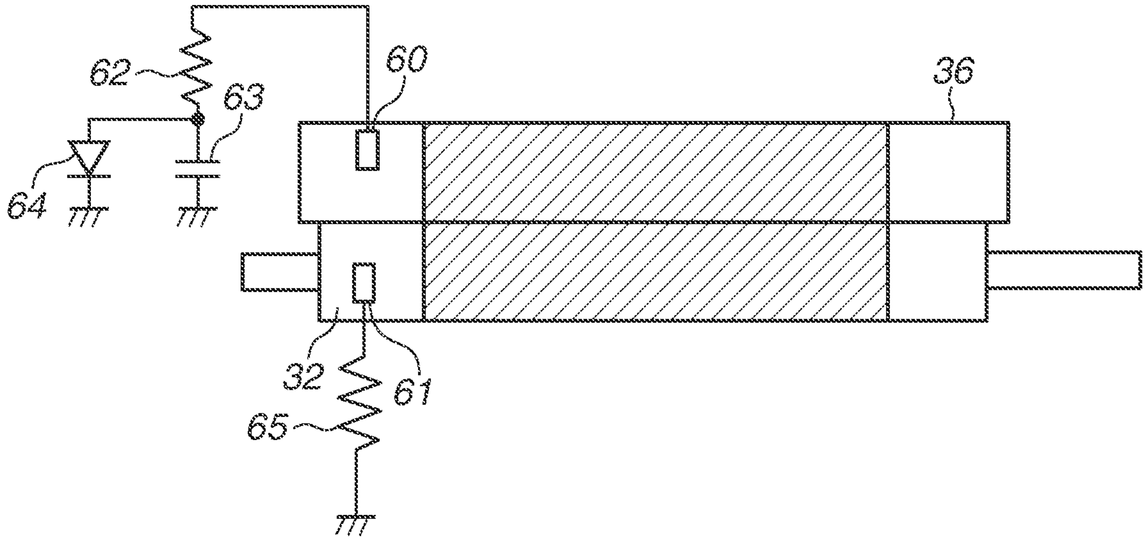
FIG. 6 illustrates contact members according to a comparative example.

FIG. 6 illustrates a comparative example. According to the comparative example, two different contact members are disposed in the region on the same one end side in the longitudinal direction.

Figure 7:
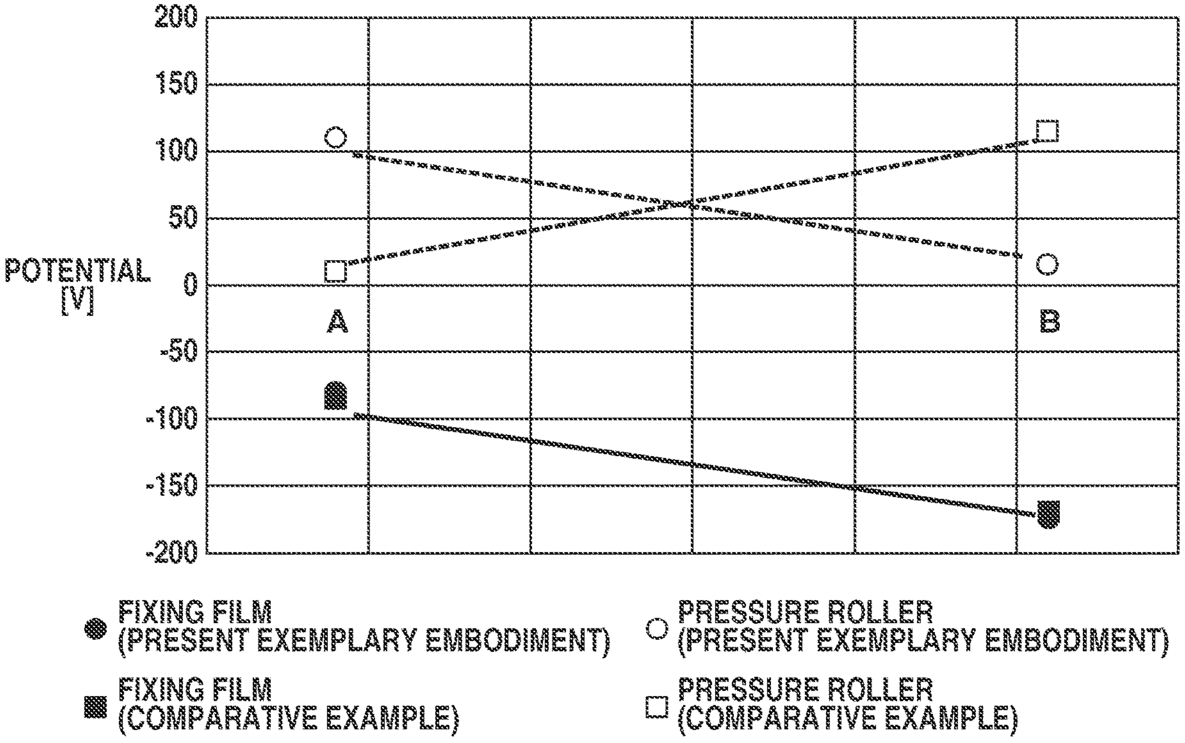
FIG. 7 illustrates surface potentials of a fixing film and a pressure roller in the longitudinal direction.

FIG. 7 illustrates charts indicating longitudinal surface potentials of the fixing film 36 and the pressure roller 32 according to the present exemplary embodiment and the comparative example. The vertical axis denotes the surface potential, the horizontal axis denotes the longitudinal position of the fixing film 36 and the pressure roller 32, a point A denotes the contact position of the contact member 60, and a point B denotes the contact position of the contact member 61. Referring to FIG. 7, the plots denote the potentials at contact positions A and B, and the solid and broken lines denote approximate lines of these potentials.

The charts in FIG. 7 according to the present exemplary embodiment will be described below. The longitudinal surface potential of the fixing film 36 has a gradient formed between about −80 to −85 V in the vicinity of the contact member 60 and −170 to −175 V on the non-contact side where the contact member 60 is not disposed (plots ●). The longitudinal surface potential of the pressure roller 32 has a gradient formed between about 15 V in the vicinity of the contact member 61 and 110 V on the non-contact side where the contact member 61 is not disposed (plots ○). The potential difference between the fixing film 36 and the pressure roller 32 is about 190 V in the longitudinal direction. This means that variations of the potential difference between the fixing film 36 and the pressure roller 32 are restricted over the entire longitudinal region.

The charts in FIG. 7 according to the comparative example will be described below. The surface potential of the fixing film 36 has a gradient formed between about −80 to −85 V in the vicinity of the contact member 60 and −170 to −175 V on the non-contact side where the contact member 60 is not disposed (plots ■). The longitudinal surface potential of the pressure roller 32 has a gradient formed between about 10 V in the vicinity of the contact member 61 and 115 V on the non-contact side where the contact member 61 is not disposed (plots □). Therefore, the potential difference between the fixing film 36 and the pressure roller 32 is about 95 V on the contact side (point A) where the contact members 60 and 61 are disposed, and about 285 V on the non-contact side (point B) where the contact members 60 and 61 are not disposed. This means that the potential difference between the fixing film 36 and the pressure roller 32 varies in the longitudinal region.

According to the comparative example, when the non-fixed toner image t is fixed to the recording material P in this state, image scattering occurs in the vicinity of the non-contact side (point B) in a case of forming a halftone image. This is because the potential difference on the non-contact side increases, and the surface potential of the fixing film 36 becomes higher than the surface potential of the pressure roller 32 for retaining the toner image t with the negative polarity on the recording material P to the recording material P. This generates a repulsive force against the toner image t on the recording material P as a cause of image scattering.

The present exemplary embodiment makes it possible to restrain variations of the potential difference between the fixing film 36 and the pressure roller 32 over the entire longitudinal region to a further extent than the comparative example. This also enables preventing the generation of image scattering due to the potential difference. The contact member 60 for grounding the fixing film 36 is disposed in the region R1 on one end side in the longitudinal direction, and the contact member 61 for grounding the pressure roller 32 is disposed in the region R2 on the other end side in the longitudinal direction. This enables equalizing the longitudinal inclinations of the gradient of the surface potential of the fixing film 36 from the contact portion to the non-contact portion and the gradient of the surface potential of the pressure roller 32 from the non-contact portion to the contact portion. This enables providing a uniform surface potential difference between the fixing film 36 and the pressure roller 32.

The contact member 60 for grounding the fixing film 36 is disposed in the region R1 on one end side in the longitudinal direction, and the contact member 61 for grounding the pressure roller 32 is disposed in the region R2 on the other end side in the longitudinal direction. This enables restricting variations of the potential difference between the fixing film 36 and the pressure roller 32 in the longitudinal direction.

A second exemplary embodiment will be described below. The first exemplary embodiment has been described above centering on a configuration where the contact member 60 is brought into contact with the surface of the fixing film 36. The second exemplary embodiment will be described below centering on a configuration where the contact member 60 is brought into contact with the inner circumferential surface of the fixing film 36. Components of the image forming apparatus 100 similar to those according to the first exemplary embodiment are assigned the same reference numerals, and redundant descriptions of the similar components will be omitted.

Figure 8:
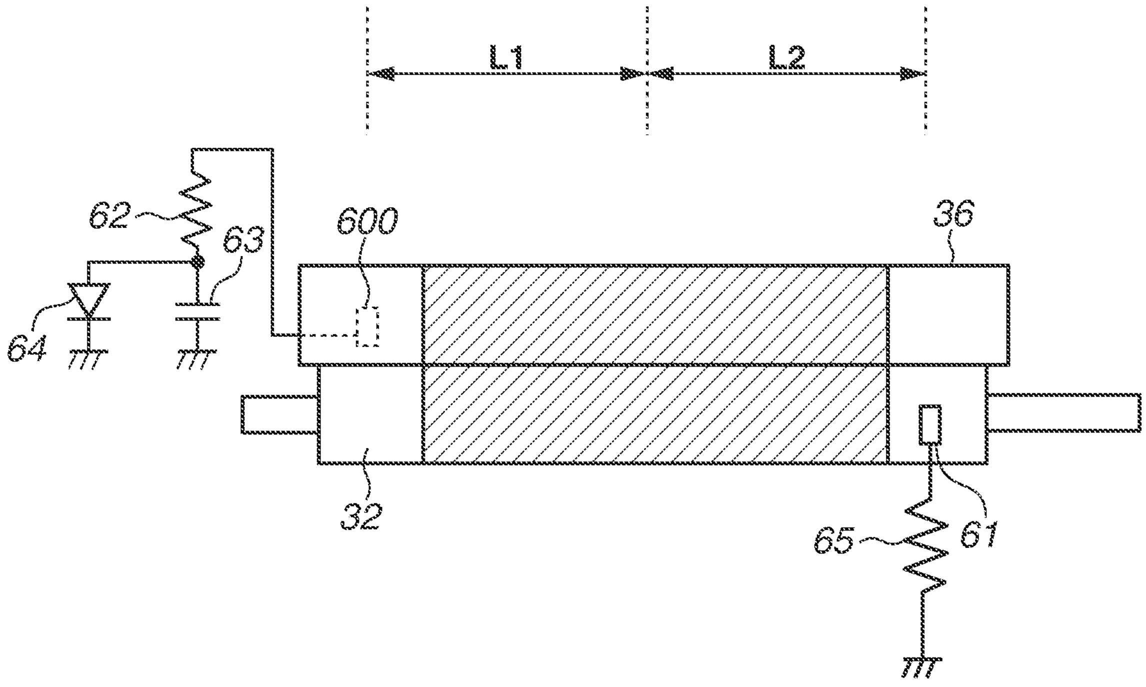
FIG. 8 illustrates contact members according to the present exemplary embodiment.

FIG. 8 illustrates arrangements of a contact member 600 and the contact member 61 according to the present exemplary embodiment. Referring to FIG. 8, like the first exemplary embodiment, the contact member 600 for grounding the fixing film 36 is disposed in the region R1 in the longitudinal direction, and the contact member 61 for grounding the pressure roller 32 is disposed in the region R2 in the longitudinal direction. The contact member 600 is disposed at the position by a distance L1 from a conveyance center, and the contact member 61 is disposed at the position by a distance L2 from the conveyance center. Although the contact members 60 and 61 are disposed so that the distances L1 and L2 are equal as an example, the present exemplary embodiment is not limited to this example. A contact member needs to be disposed in each of the region R1 on one end side in the longitudinal direction and the region R2 on the other end side in the longitudinal direction.

Figure 9:
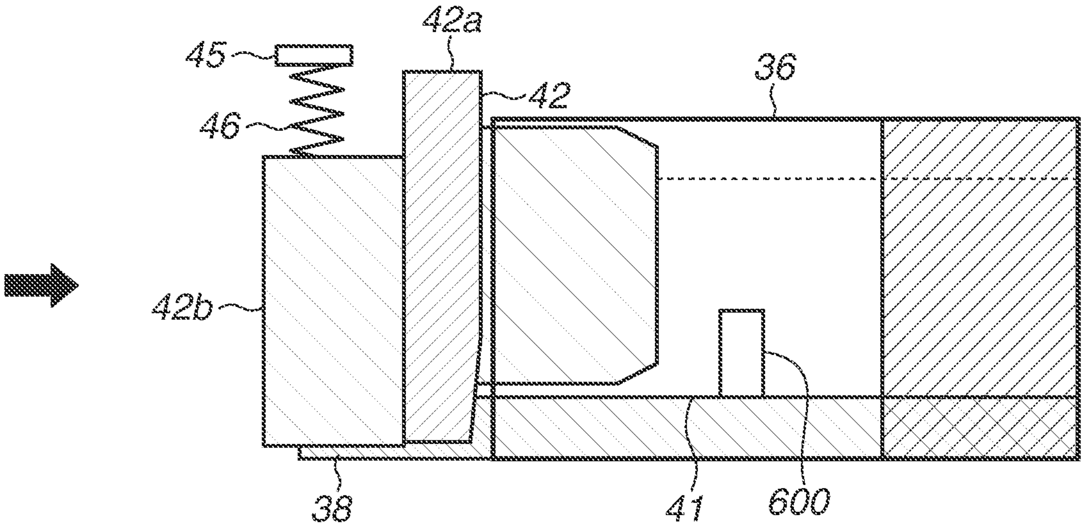
FIG. 9 is an enlarged view illustrating a contact member.
Figure 10:
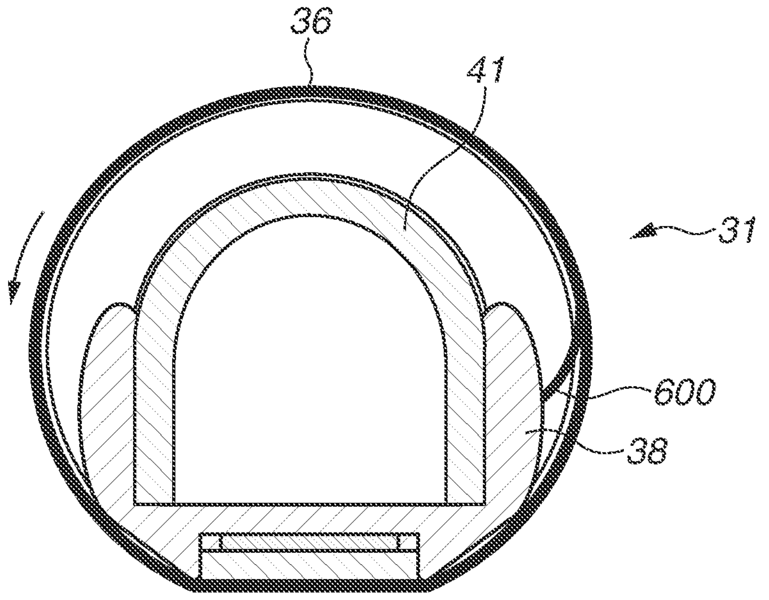
FIG. 10 is a cross-sectional view illustrating the fixing apparatus viewed from the longitudinal direction.

FIG. 9 is a partial enlarged view illustrating the contact member 600, and FIG. 10 is a cross-sectional view illustrating the contact member 600 in FIG. 9 viewed from the direction of the arrow.

The contact member 600 is in contact with the fixing film 36 from the inner circumferential surface of the fixing film 36. Like the first exemplary embodiment, the contact member 600 is a polyimide film containing distributed carbon and having a thickness of 60 μm, a height of 22 mm, and a width of 6.55 mm. The fixing film 36 is a cylindrical flexible member including a base layer 36*a*, an elastic layer 36*b* formed outside the base layer 36*a*, and a mold release layer 36*c* formed outside the elastic layer 36*b*. The longitudinal surface resistance value of the base layer 36*a* is set to 154.0 MΩ or less when 250 V is applied by using the Digital Megohm HiTester from HIOKI E.E. CORPORATION.

As a method for bringing the contact member 600 and the fixing film 36 into contact with each other, the polyimide film as the contact member 600 is disposed in the space inside the fixing film 36 so that the longer side of the contact member 600 is parallel to the rotational direction of the fixing film 36, and the contact member 600 comes into contact with the fixing film 36 with a contact pressure of 0.0148 to 0.0235 N in the forward direction. This configuration is intended to prevent an electrostatic offset or banding that occurs when the AC voltage oscillation driving the heater 37 of the fixing apparatus 18 is superimposed on the DC voltage of the transfer nip portion across the recording material P.

Because the contact member 600 is in contact with the inner circumferential surface of the fixing film 36, the contact member 600 does not need to be disposed in the region closer to one end side in the longitudinal direction than the paper feed region. This means that the contact member 600 may be disposed even in the paper feed region as long as it is disposed closer to the one end side in the longitudinal direction than the center reference. This is because the contact member 600 is in contact with the inner circumferential surface of the fixing film 36. Even if a paper jam occurs in the fixing apparatus 18 or if toner adheres to the surface of the fixing film 36 because of an image offset, for example, the above-described configuration enables preventing the adhering toner from smearing the surface of the contact member 600. Even if the contact member 600 is disposed in the paper feed region, the above-described configuration enables preventing defective contact and a damage to the fixing film 36 due to toner adhering to the contact member 600.

Figure 11:
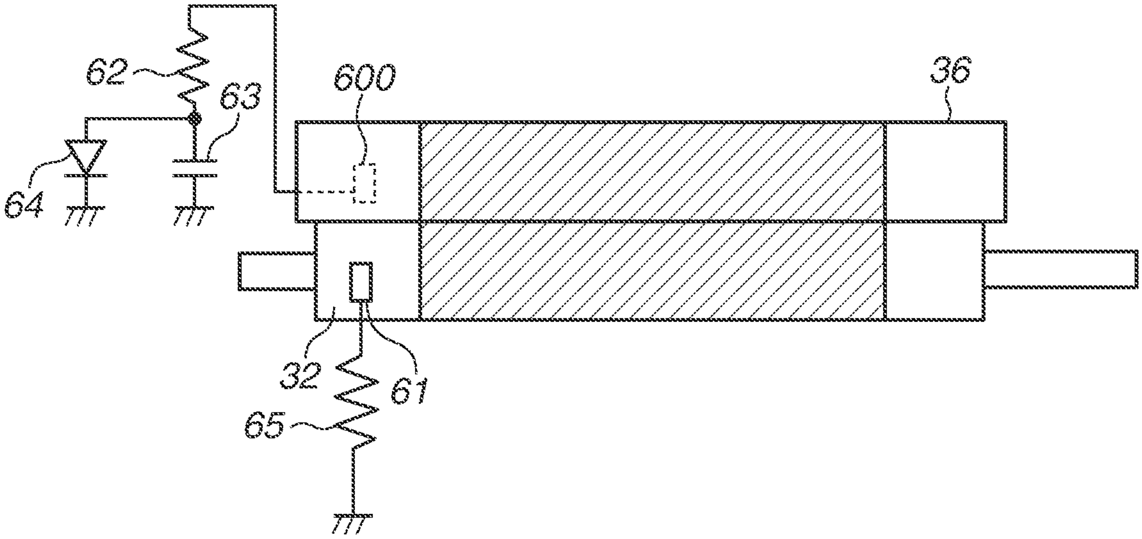
FIG. 11 illustrates contact members according to a comparative example.

FIG. 11 illustrates a comparative example. According to the comparative example, two different contact members are disposed in the region on the same one end side in the longitudinal direction.

Figure 12:
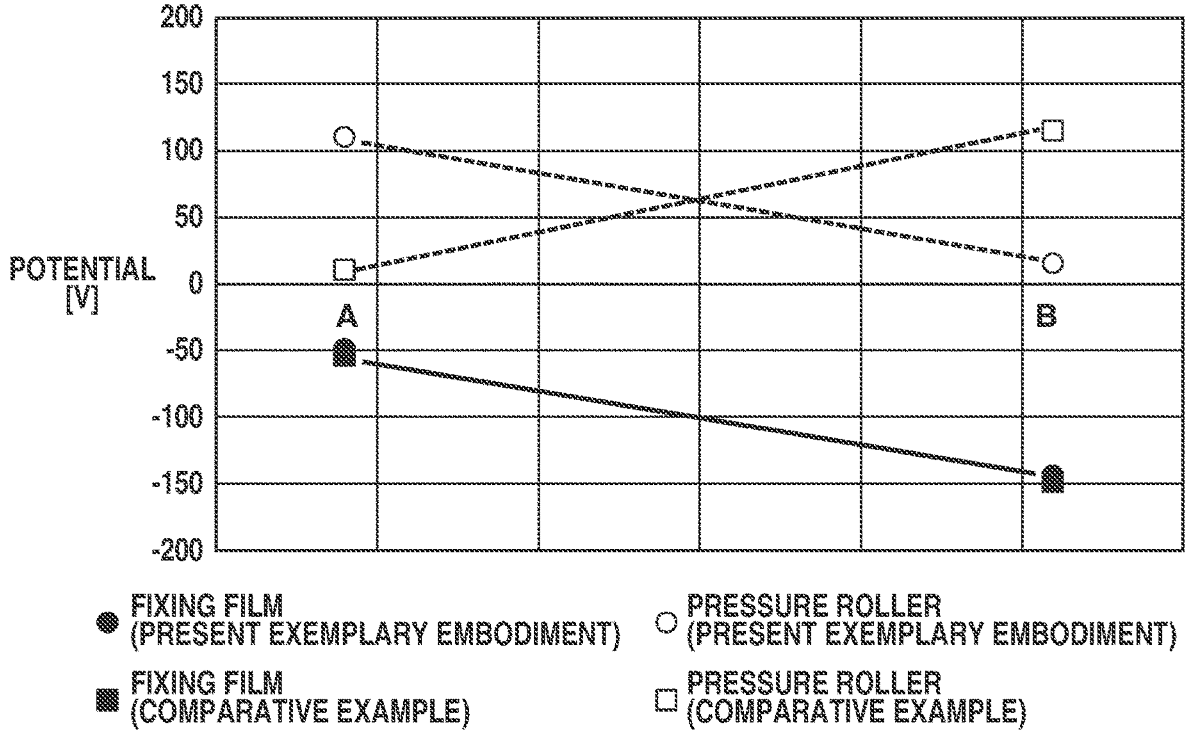
FIG. 12 illustrates surface potentials of a fixing film and a pressure roller in the longitudinal direction.

FIG. 12 illustrates charts indicating longitudinal surface potentials on the fixing film 36 and the pressure roller 32 according to the present exemplary embodiment and the comparative example. The vertical axis denotes the surface potential, the horizontal axis denotes longitudinal position on the fixing film 36 and the pressure roller 32, a point A denotes the contact position of the contact member 600, and a point B denotes the contact position of the contact member 61. Referring to FIG. 12, the plots denote the potentials at the contact positions A and B, and the solid and broken lines denote approximate lines of the potentials.

The charts in FIG. 12 according to the present exemplary embodiment will be described below. The longitudinal surface potential of the fixing film 36 has a gradient formed between about −50 to −55 V in the vicinity of the contact member 600 and −145 to −150 V on the non-contact side where the contact member 600 is not disposed (plots ●). The longitudinal surface potential of the pressure roller 32 has a gradient formed between about 15 V in the vicinity of the contact member 61 and 110 V on the non-contact side where the contact member 61 is not disposed (plots ○). The potential difference between the fixing film 36 and the pressure roller 32 is about 160 V in the longitudinal direction. This means that variations of the potential difference between the fixing film 36 and the pressure roller 32 are restricted over the entire longitudinal region.

The charts in FIG. 12 according to the comparative example will be described below. The surface potential of the fixing film 36 has a gradient formed between about −50 to −55 V in the vicinity of the contact member 600 and −145 to −150 V on the non-contact side where the contact member 600 is not disposed (plots ■). The longitudinal surface potential of the pressure roller 32 has a gradient formed between about 10 V in the vicinity of the contact member 61 and 115 V on the non-contact side where the contact member 61 is not disposed (plots □). Accordingly, the potential difference between the fixing film 36 and the pressure roller 32 is about 65 V on the contact side (point A) where the contact members 600 and 61 are disposed, and about 265 V on the non-contact side (point B) where the contact members 600 and 61 are not disposed. This means that the potential difference between the fixing film 36 and the pressure roller 32 varies in the longitudinal region.

According to the comparative example, when the non-fixed toner image t is fixed to the recording material P in this state, image scattering occurs in the vicinity of the non-contact side (point B side) in a case of forming a halftone image.

This is because the potential difference on the non-contact side increases, and the surface potential of the fixing film 36 becomes higher than the surface potential of the pressure roller 32 that retains the toner image t with the negative polarity on the recording material P to the recording material P. This generates a repulsive force against the toner image t on the recording material P as a cause of image scattering.

The present exemplary embodiment makes it possible to restrain variations of the potential difference between the fixing film 36 and the pressure roller 32 over the entire longitudinal region to a further extent than the comparative example. This also enables preventing the generation of image scattering due to the potential difference. The contact member 600 for grounding the fixing film 36 is disposed in the region R1 on one end side in the longitudinal direction, and the contact member 61 for grounding the pressure roller 32 is disposed in the region R2 on the other end side in the longitudinal direction. This enables equalizing the longitudinal inclinations of the gradient of the surface potential of the fixing film 36 from the contact portion to the non-contact portion and the gradient of the surface potential of the pressure roller 32 from the non-contact portion to the contact portion. This enables providing a uniform surface potential difference between the fixing film 36 and the pressure roller 32.

The contact member 600 for grounding the fixing film 36 is disposed in the region R1 on one end side in the longitudinal direction, and the contact member 61 for grounding the pressure roller 32 is disposed in the region R2 on the other end side in the longitudinal direction. This enables restricting variations of the potential difference between the fixing film 36 and the pressure roller 32 in the longitudinal direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-012440, filed Jan. 31, 2023, which is hereby incorporated by reference herein in its entirety.

What is claimed is:

1. A fixing apparatus comprising:

a first rotating member;

a heater that is elongate and provided with a heating element and a substrate with the heating element installed on the substrate, and disposed in a space inside the first rotating member;

a second rotating member, wherein the first rotating member is pinched by the heater and the second rotating member, and an image formed on a recording material is heated at a nip portion, via the first rotating member, so that the image is fixed to the recording material;

a first contact member configured to come into contact with the first rotating member to ground the first rotating member; and a second contact member configured to come into contact with the second rotating member to ground the second rotating member, wherein, in a case where a direction of a longer side on a surface of the substrate where the heating element is disposed is a longitudinal direction and a direction perpendicularly intersecting with the longitudinal direction on the surface of the substrate is a widthwise direction, the first contact member is disposed in a region outside a region where a recording material with a maximum size conveyed to the nip portion passes through the nip portion on one end side in the longitudinal direction on an outer circumferential surface of the first rotating member, and the second contact member is disposed in the region outside the region where the recording material with the maximum size conveyed to the nip portion passes through the nip portion on an other end side in the longitudinal direction on an outer circumferential surface of the second rotating member.

2. The fixing apparatus according to claim 1, wherein, in a case where, in the longitudinal direction, the region where the recording material with the maximum size conveyed to the nip portion passes through the nip portion is a first region and a region where the recording material does not pass through the nip portion is a second region, the first contact member is disposed in the first region on the one end side, and the second contact member is disposed in the second region on the other end side.

3. The fixing apparatus according to claim 1, wherein, in the longitudinal direction, a distance from a conveyance reference of the recording material to be conveyed to the nip portion to the first contact member is a first distance, and a distance from the conveyance reference to the second contact member is a second distance, and wherein the first distance and the second distance are equal.

4. The fixing apparatus according to claim 1, wherein, in the longitudinal direction, a distance from a center of the first rotating member to the first contact member is a first distance, and a distance from a center to the second contact member is a second distance, and wherein the first distance and the second distance are equal.

5. The fixing apparatus according to claim 1, wherein the first contact member is grounded via a first resistor and a capacitor, and the second contact member is grounded via a second resistor.

6. The fixing apparatus according to claim 1, wherein the first rotating member is a film, and the second rotating member is a pressure roller, and wherein the heater is disposed in a space inside the film, the film is pinched by the heater and the pressure roller, and an image formed on the recording material is heated via the film at the nip portion.

7. The fixing apparatus according to claim 6, wherein the film includes a base layer, and a surface layer as a mold release layer on the base layer, and wherein a surface resistance of the base layer is 154.0 MΩ or less.

8. The fixing apparatus according to claim 6, wherein the pressure roller includes an elastic layer, and a surface layer as a mold release layer on the elastic layer, and wherein a surface resistance of the surface layer is 5.0 MΩ or less.

9. An image forming apparatus comprising:

the fixing apparatus according to claim 1; and an image forming unit configured to form the image on the recording material, wherein the fixing apparatus is configured to fix the image formed on the recording material to the recording material.

* * * * *